(12) United States Patent
Bell et al.

(10) Patent No.: US 6,425,848 B2
(45) Date of Patent: Jul. 30, 2002

(54) CUTTING OR SEALING PLASTICS MATERIAL

(75) Inventors: Peter Arthur Bell, Bedford; Andrew Paul Sears, Herts; David Frederick Lines, Bedford, all of (GB)

(73) Assignee: Ceetak Limited, Bedford (GB)

(*) Notice: Subject to any disclaimer, the term of this patent is extended or adjusted under 35 U.S.C. 154(b) by 0 days.

(21) Appl. No.: 09/264,172

(22) Filed: Mar. 5, 1999

(30) Foreign Application Priority Data

Mar. 7, 1998 (GB) ................................. 9804866

(51) Int. Cl.⁷ .................. B31B 1/28; B31B 49/00
(52) U.S. Cl. .......................... 493/470; 341/207
(58) Field of Search ................... 493/341, 470, 493/189, 194, 207, 209, 340

(56) References Cited

U.S. PATENT DOCUMENTS

| | | | | |
|---|---|---|---|---|
| 3,035,381 A | * | 5/1962 | Hosso | 493/341 |
| 4,582,555 A | * | 4/1986 | Bower | 493/470 |
| 4,860,621 A | * | 8/1989 | Totani | 493/470 |
| 4,946,432 A | * | 8/1990 | Susini et al. | 493/341 |
| 4,979,932 A | * | 12/1990 | Burnside | 493/134 |
| 4,994,137 A | * | 2/1991 | Yanai | 493/470 |
| 5,015,223 A | * | 5/1991 | Boeckmann | 493/470 |
| 5,056,295 A | | 10/1991 | Williams | 53/450 |
| 5,140,800 A | * | 8/1992 | Martin et al. | 493/33 |
| 5,232,430 A | * | 8/1993 | Nitsch | 493/341 |
| 5,357,731 A | * | 10/1994 | Conway et al. | 493/208 |
| 5,376,219 A | * | 12/1994 | Sperry et al. | 493/204 |

FOREIGN PATENT DOCUMENTS

| | | |
|---|---|---|
| DE | 7025999 | 12/1970 |
| DE | 2 245 394 | 3/1974 |
| EP | 0 064 713 | 11/1982 |
| GB | 2 243 802 | 11/1991 |
| GB | 2 243 930 | 11/1991 |
| WO | WO 93/24302 | 12/1993 |

OTHER PUBLICATIONS

Schematic drawing of an impulse system (2 pages).
Schematic drawing of a cartridge heater (1 page).
Schematic drawing of a low thermal inertial dye (1 page).

* cited by examiner

*Primary Examiner*—Brian L. Johnson
*Assistant Examiner*—Mathew Luby
(74) *Attorney, Agent, or Firm*—Townsend and Townsend and Crew LLP

(57) ABSTRACT

A low thermal inertia die (10) must be heated to a specific set temperature to cut/seal plastics material. As heat energy is dissipated during cutting/sealing it is replaced by an equivalent amount of thermal energy from an electrical heating element (26) embedded in the die, adjacent the profiled working face (22) which in use contacts plastics material. The element (26) is covered in electrically non-conductive tape (28) and encased in flattened steel tube (30). A thermocouple (32) is also embedded in the die (10), with its tip (34) located to sense the temperature of a central region of the working face (22). The electrical current supplied to the electrical resistance heating element (26) is controlled in dependence upon the temperature sensed.

10 Claims, 4 Drawing Sheets

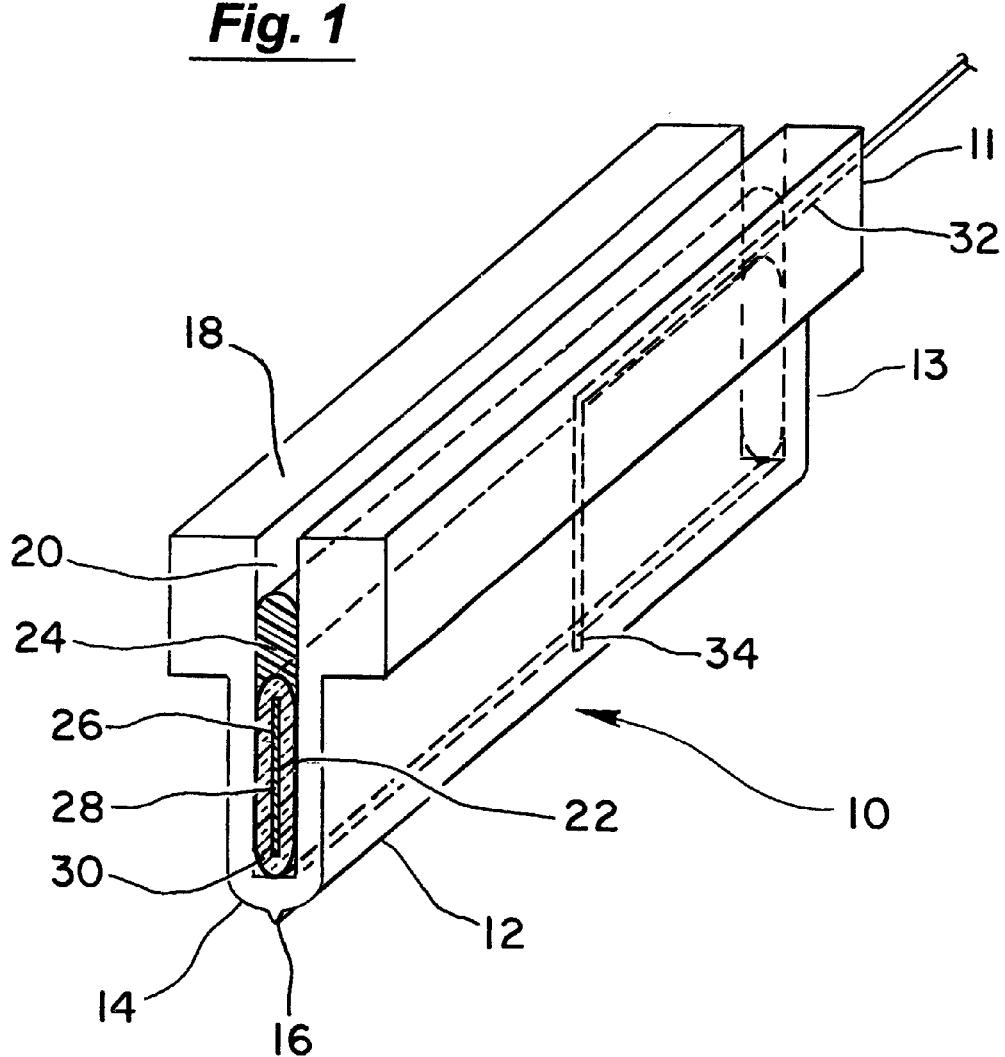

CUTTING OR SEALING PLASTICS MATERIAL

DESCRIPTION

The present invention relates to apparatus for cutting or sealing plastics materials, in particular plastics packaging materials in sheet, roll or bag form.

It is known to seal or join flexible plastics packaging material by welding using heat supplied for example by electrically heated resistance wires, or by heated metal dies (cartridge heaters). The electrically heated resistance wires become extremely hot in order to effect sealing and localized overheating and even fuming of the plastics material is not uncommon. In contrast, the temperature of the cartridge heaters is more closely controlled since too low a temperature will result in poor or no sealing of the plastics film, whereas too high a temperature would seriously damage, the plastic film again resulting in poor or no sealing. Historically, cartridge heaters have comprised quite large metal blocks having a high thermal inertia in an attempt to provide temperature stability. This however means that it is impossible quickly to change or even correct the die temperature relative to a required target temperature. With both electrically heated resistance wires and cartridge heaters, cutting of the plastics film is sometimes achieved with a separate cutting operation.

The present applicant has pioneered so-called low thermal inertia dies for cutting or sealing plastics material. The low thermal inertia dies do not rely on thermal inertia to maintain desired temperature and resist temperature fluctuations (as distinct from conventional cartridge heaters), and do not rely on heating to temperatures well in excess of that required to seal plastics materials. Instead, a low thermal inertia die is heated to an exact temperature required to seal the plastics material in question, and as heat energy is dissipated during operation it is replaced by an equivalent amount of thermal energy from an electrical heating element mounted on the die.

When using a low thermal inertia die, accurate control of the temperature of the die is essential. In high throughput applications in particular, the desired die temperature must be restored as quickly as possible during each sealing operation in readiness for the next plastics material for sealing. A need is seen for an improved low thermal inertia sealing die which enables even more accurate sealing operations to be performed.

In accordance with a first aspect of the present invention, there is provided apparatus for cutting or sealing plastics material, comprising a low thermal inertia die having a working face which in use opposes plastics material to be cut or sealed, and an electrical resistance heating element for heating the low thermal inertia die, wherein the electrical resistance heating element is embedded in the low thermal inertia die.

Embedding the electrical resistance heating element in the low thermal inertia die enables highly efficient transfer of heat energy from the element to the die. Embedding also enables the electrical resistance heating element to be positioned substantially adjacent the working face of the electrical resistance heating element, in which case heat energy will be provided where the majority will be dissipated. Such an arrangement offers improved performance over a prior low thermal inertia die where the heating element was located on the surface of the die, remote from the working face. As heat energy is delivered exactly where it is required, low voltage heating elements may be used.

The working face of the low thermal inertia die may have a profile adapted to achieve predetermined sealing or cutting geometry. The profile may include a ridged region to provide an edge for cutting and producing narrow seal bands either side of the cut. The profile may include a chamfered region, perhaps either side of the ridged region, to provide an enlarged surface for producing wider seal bands.

The apparatus may further comprise means for controlling electrical current supplied to the electrical resistance heating element. This control may be effected in response to the temperature of the low thermal inertia die. precise temperature control is extremely important with low thermal inertia dies, which typically will operate from 140–220° C., depending upon the plastics material being sealed/cut.

The apparatus may further comprise means for sensing the temperature of the working face of the low thermal inertia die. The temperature sensing means may comprise a thermocouple, with the tip of the thermocouple located inside the low thermal inertia die, adjacent the working face. Preferably, the thermocouple is located to sense the temperature of a central region of the work face. Alternatively, the temperature sensing means may comprise means for measuring electrical resistance of the electrical resistance heating element, and means for determining temperature in dependence upon electrical resistance measured.

The electrical resistance heating element may be elongate, and may be received in a groove provided in the low thermal inertia die. At least one side or floor of the groove is preferably adjacent the working face. The electrical heating element may comprise a low resistance nickel-chrome strip covered in an electrical insulator. Preferably, the electrical insulator is thermally conductive. The electrical heating element may be encased within a metal housing, with the electrical insulator isolating the electrical heating element from the metal housing. The metal housing enables heat to be efficiently drawn from the electrical heating element. The metal housing may be formed from a tube. Extensive contact between the metal tube and the electrical insulator may be achieved by flattening the metal tube around the electrical heating element. The metal housing may have a profile to be a snug fit in the groove. Snug or friction fitting between the metal housing and the low thermal inertia die enables good thermal contact there between. Additional thermal transfer may be achieved using a conductive filler or bonding agent such as silicone.

The apparatus may further comprise a bolster for supporting the low thermal inertia die, and thermally insulated holding means for mounting the low thermal inertia die on the bolster. The thermally insulated holding means prevents significant amounts of heat energy escaping to the bolster which could otherwise represent a massive heat sink. The apparatus may further comprise an anvil, with at least one of the low thermal inertia die and the anvil being moveable towards the other for biasing the work face against opposed plastics material. The anvil may be electrically heated. Heating the anvil may increase running speeds of the apparatus and may improve feed quality. The temperature of the anvil may be controlled in response to the output of a temperature sensing means associated there with. The surface of the anvil facing the working face may be planar, or it may have a profile corresponding to that of the working face of the low thermal inertia die. The anvil may even be of rotary type, perhaps rotating at a speed to match movement of plastics material past the die. The anvil may be of rubber, silicon, PTFE or fibre glass.

The working face of the low thermal inertia die may be covered with a non-stick coating. The low thermal inertia die may be of aluminium, and may be formed by extrusion, possible with the groove for receiving the electrical resistance heating element. The working face of the low thermal inertia die may be linear or curvilinear, even circular. With a low thermal inertia die, the mass of material constituting the die itself is usually low. Accordingly, the low thermal inertia die may be blade-like, with the depth of the die being greater than the width of the die. In order to be adjacent the working face or edge of a blade-like die, a strip-shaped electrical resistance heating element may be embedded in the low thermal inertia die with one elongate edge closer to the working face than the other.

Desirably arms or clamp side plates may be provided to either side of the low thermal inertia die for contacting the plastics sheeting, carrying it into contact with the anvil and holding it in position as it is cut or sealed.

The arms are preferably carried on the bolster by resilient members allowing relative movement of the arms relative to the bolster. Alternatively the arms may be fixed relative to the bolster.

Control of the temperature of the low thermal inertia die is preferably effected in response to the output of the temperature sensing means by a control unit which controls operation of a relay in the power circuit of the electrical resistance heating element.

The control unit may be programmed/programmable to control the heating effect of the electrical current sent to the electrical resistance heating element. Parameters which may be programmed/programmable within the controller include the length of time for which the low thermal inertia die must be heated before it reaches an operating temperature; the temperature at which it is desired to operate the low thermal inertia die—the set point; and the range of temperatures to either side of the set point temperature which is permissible; and a maximum set point temperature above which the low thermal inertia die cannot be heated. The set point is dependent upon a number of factors, including thickness and type of plastics material and desired speed of operation.

In accordance with another aspect, the invention provides apparatus for cutting and/or sealing sheet or roll plastics materials comprising a blade which is electrically heated and which is movable to bias the plastics sheet or roll against an anvil, wherein the blade is supported in a bolster by thermally insulating holders.

The bolster may be movable to carry the blade to bias the plastics sheet or roll against the anvil; or the anvil may be movable to bias the plastics sheet or roll against the heated blade; or both bolster and anvil may be movable.

Embodiments for the invention will now be described by way of example with reference to the accompanying drawings, in which:

FIG. 1 shows schematically a perspective end section view of a low thermal inertia die used in apparatus embodying the present invention;

Figure 2A:
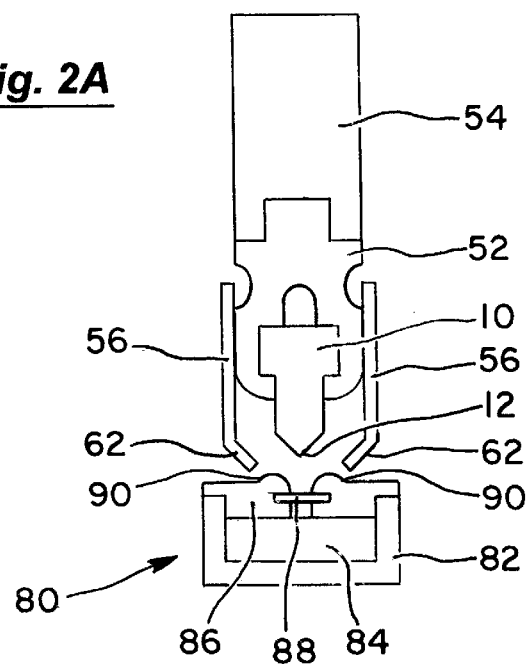
FIG. 2 shows at A and B respectively an end view and a side view of a apparatus incorporating the low thermal inertia die of FIG. 1.

FIG. 1 shows a low thermal inertia die 10 having a base portion 11, a working face 12, and a blade-like portion 13 therebetween. The working face 12 has a generally rounded periphery 14 and a central ridge 16. The rear surface 18 has a groove 20 extending towards and terminating adjacent the working face 12, and running the length of the die 10. An elongate electrical heater assembly 22 is embedded in the die 10 at the bottom of the groove 20, and held partly by friction with the side walls and partly by silicone bonding agent 24. The heater assembly 22 comprises a low resistance nickel chrome strip 26 covered in electrically non-conductive tape 28 (e.g., Kapton insulating tape), all encased in a flattened steel tube 30. (Electrical connections to the strip 26 have been omitted for improved clarity). A thermocouple 32 is also embedded in the die 10, with the tip 34 located to sense the temperature of a central region of the working face 12.

Figure 2B:
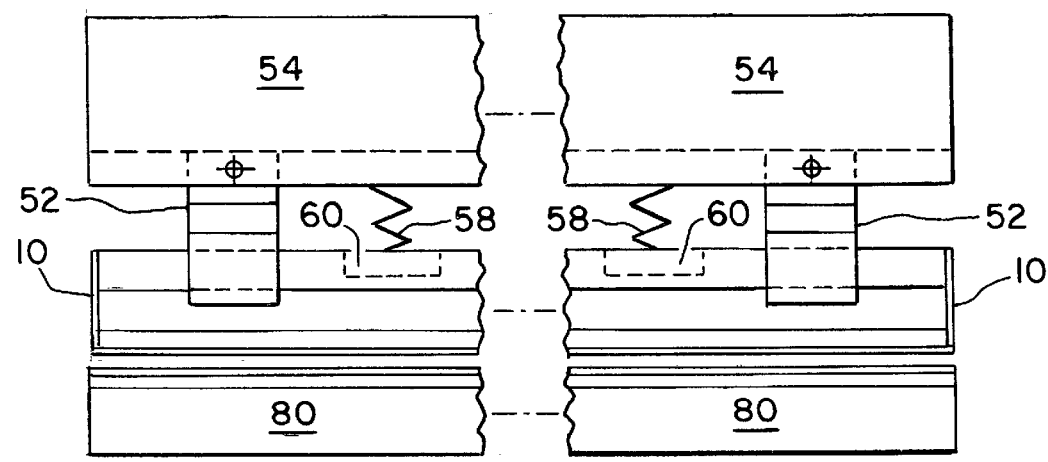

Referring to FIGS. 2A and 2B, the low thermal inertia die 10 is supported by thermally non-conductive holders 52 on a bolster 54.

Bolster 54 also carries a pair or arms or clamp side plates 56 which lie on either side of the holders 52 and die 10. The arms 56 normally depend below the working face 12. The arms 56 are supported on the bolster by spring members 58 coupled to support blocks 60 to which the arms are attached. The lowermost ends of the arms 56 extend also partially inwardly as shown at 62. As can be seen, the ends 62 of the arms 16 are normally below working face 12.

The arms 56 may be pushed upwardly against the bias of the spring members 58 such that their lowermost ends 62 lie above the working face 12 of die 10.

An anvil 80 is shown immediately below the bolster/die assembly and comprises a U-channel member 82. The central portion of channel 82 has a flexible, e.g. elastomeric, material core 84 the upper part of which is covered by a shaped/profiled member 86.

In the example shown profiled member 86 rises to either side 90 of the centre line of the anvil 80—which is positioned in line with the central ridge of the die 10. At its centre the profiled member 86 carries a fibre glass strip insert 88. Profiled member 86 is flexible and desirably of an elastomeric material, which may be same or differ from that forming the core 84.

It will be appreciated that when two sheets of plastics, e.g. polythene, sheet are placed between blade 10 and anvil 80 movement of the blade towards the anvil (or vice versa) will cause the sheets to be stretched over the raised section 90 of the profiled member 86. The sheets will be forced down to either side of the raised portions by the arms 56—the lowermost ends 62 engaging the top sheet. Continued movement of the die/bolster assembly will cause the arms 56 to be driven up against the bias of the spring members 58 until the working face 12 extends below the lowermost ends 62 of the arms 56. In time the die 10 bears upon the fiber glass insert 88 and will cause the plastics sheets to be fused and, if the anvil 80 and working face 12 are appropriately shaped (e.g., by having central ridge 16), to cut along the center line of the anvil. The fiber glass insert 88 may if desired be electrically heated.

Figure 3:
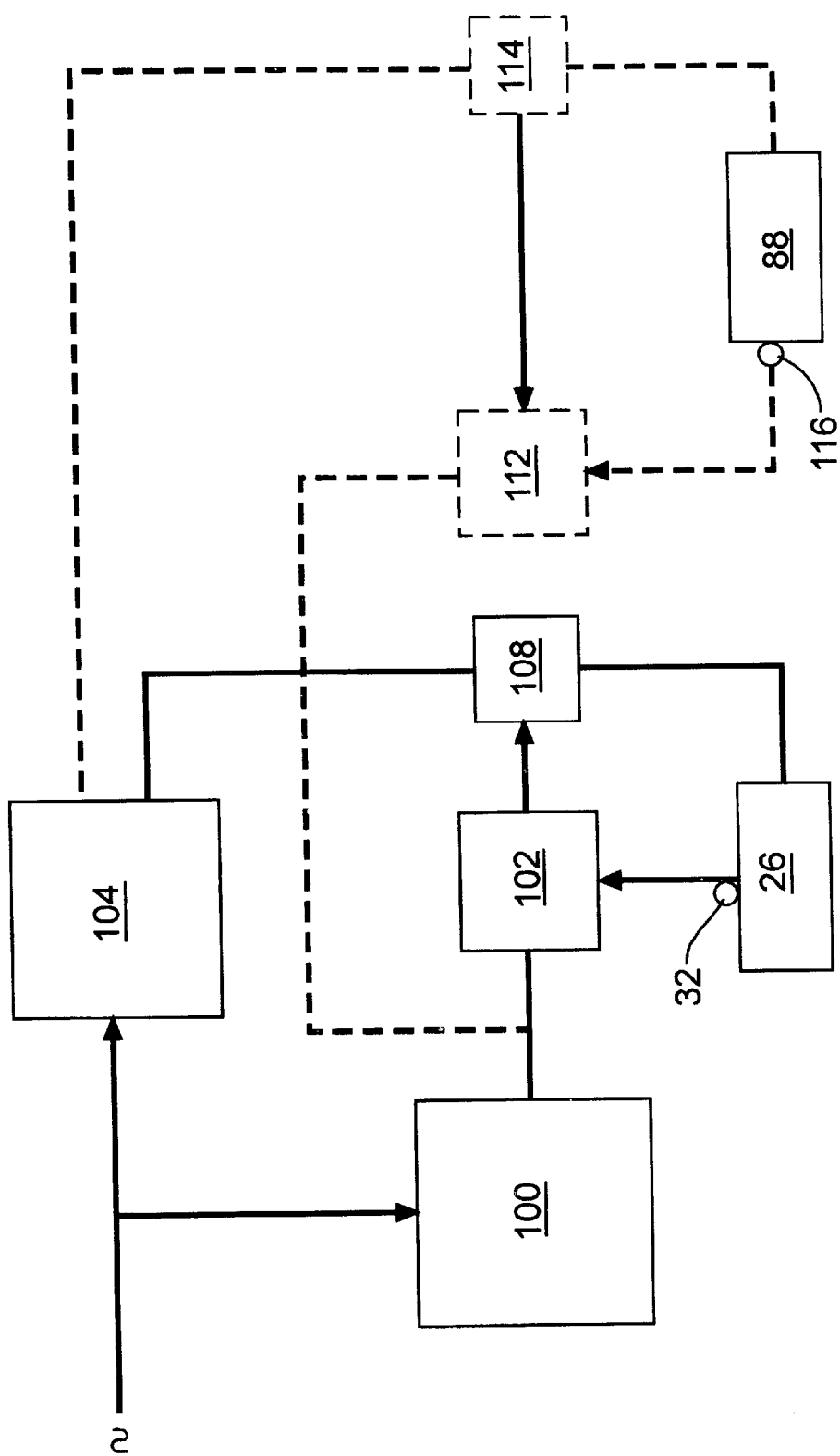
FIG. 3 shows, in highly schematic form, an electrical circuit for use in controlling the apparatus of FIG. 2A and 2B.

FIG. 3 schematically illustrates a control system for use in controlling the apparatus of the invention.

A step down voltage transformer 100 is operable to receive mains voltage (110, 240 v) and provide an output at 12 v to a controller 102 (e.g., as supplied by CAL under reference CAL 3300). Another step down voltage transformer 104 similarly receives mains voltage and is operable to give a range of output voltages from 15 v, to 50 v for supplying power to a heater element 26 included in die 10 via a solid state relay 108 operation of which is controlled by controller 102. Controller 102 has an input from the thermocouple 32 associated with heater 26 in die 10.

Controller 102 switches solid state relay 108 on and off and thereby controls the supply of power to the heater 26 in die 10 and thus the temperature of the die. The rate at which the controller 102 switches the relay 108 varies in dependence upon how fast heat is being removed from the die so that the temperature remains accurate especially at the working face 12 of the die 10.

As shown in dotted outline in FIG. 3 transformer 104 may also supply power to heat the fiber glass insert strip 88. If this is done the power is supplied under the control of a second controller 112 switching a second solid state relay 114 in response to the output of a second thermocouple 116 associated with the strip 88.

Transformer 104 is preferably a toroidal transformer which has an output with reduced noise and is cleaner. Other ways of controlling the electrical current supplied to the die 10 to heat the die 10 may be used if desired.

It is to be noted that die 10 is held on bolster 54 by thermally non-conductive holders. This reduces the power required to heat the die 10 and means the temperature can be kept more accurately in the die 10 as little heat is transferred to the bolster 54. Additionally the thermally non-conductive holders 52 serve to electrically insulate the die.

The die 10 is made of an extruded aluminium section coated in a non-stick coating. The profile of the working face 12 can be as shown or varied depending upon customer requirements, for example crimp seal, band seal, sealing cut, seal, cut and seal.

The bolster 54 is movable to carry the die 10 in to contact with the anvil 80. Also, the anvil 80 may be movable to contact the die 10.

It will be seen that various modifications may be made to the described arrangement. For example it is possible that one could you fixed arms or clamped side plates which will pass over the side of the anvil pulling the plastics film down to either side of the anvil. In this way tension is put on the plastics film which is able to pull away from the die once the die is retracted.

It will be appreciated that other modifications may be made to the described arrangements without departing from the scope of the present invention.

Figure 4:
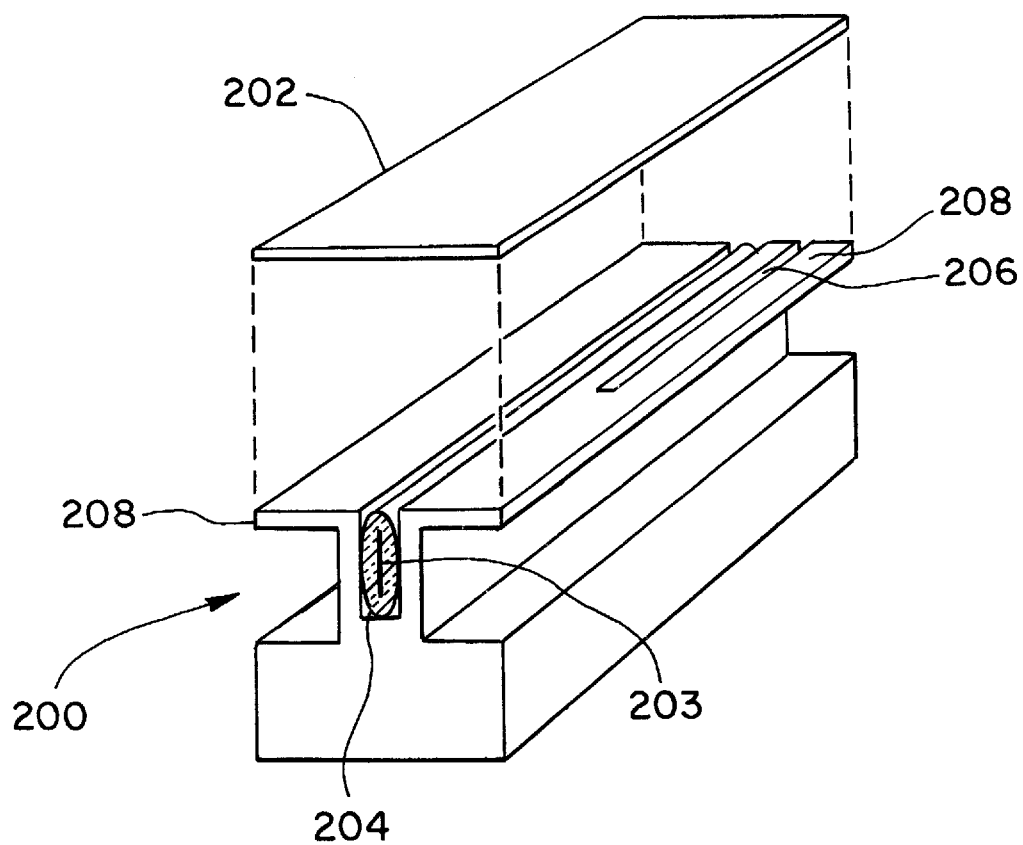
FIG. 4 shows schematically an exploded view of a low thermal inertia die in accordance with another embodiment of the present invention.

FIG. 4 shows an alternative embodiment of the present invention; a low thermal inertia die 200 for use in sealing plastics material as it "floats" across a working face in the form of plate 202. The die has an electrical heating assembly 203 the same as shown in FIG. 1, and which is mounted in groove 204 in much the same way as shown in FIG. 1. A thermocouple is provided in recess 206 in one of the flanges 208 for sensing the temperature of plate 202. The plate 202 is in the form of a cover and would need to be screwed to one of the flanges 208. Alternatively, the plate could be integral with the flanges 208, with the groove and recess for the heating assembly 203 and thermocouple respectively being provided from the reverse side of the die 200.

We claim:

1. Apparatus for cutting or sealing plastics material, comprising:
    a low thermal inertia die having a base portion for engagement by a bolster, a blade-like portion, and a central ridge disposed on a working face of the blade-like portion and which in use opposes plastics material to be cut or sealed, the blade-like portion spacing the working face from the base portion;
    a strip-shaped electrical resistance heating element embedded in the low thermal inertia die and configured to heat the low thermal inertia die, the strip-shaped electrical resistance heating element having first and second elongate edges; and
    a sensor configured to sense temperatures at the working face of the low thermal inertia die;
    wherein the blade-like portion of the low thermal inertia die includes a groove adjacent and extending an entire length of the working face, the strip-shaped electrical resistance heating element being embedded in the groove adjacent the working face with the first elongate edge closer thereto than the second elongate edge.

2. Apparatus according to claim 1, wherein the working face has a profile adapted to achieve required seal or cut geometry.

3. Apparatus according to claim 1, wherein the sensor is configured to sense temperatures of a central region of the working face.

4. Apparatus according to claim 1, wherein the electrical heating element is covered in an electrical insulator and encased in a metal housing.

5. Apparatus according to claim 4, wherein the metal housing is a snug fit in the groove.

6. Apparatus according to claim 1, further comprising a bolster for supporting the low thermal inertia die, and a thermally insulated mount for mounting the low thermal inertia die on the bolster.

7. Apparatus according to claim 1, further comprising an anvil, with at least one of the low thermal inertia die and the anvil being moveable towards the other for biasing the work face against opposed plastics material.

8. Apparatus according to claim 7, further comprising clamp side plates on either side of the working face for contacting opposed plastics material when biased between the low thermal inertia die and the anvil.

9. Apparatus according to claim 1, further comprising a controller for controlling electrical current supplied to the electrical resistance heater in dependence upon temperature sensed by the sensor.

10. Apparatus for cutting or sealing plastics material, comprising:
    a low thermal inertia die having a base portion for engagement by a bolster, a blade-like portion, and a central ridge disposed on a working face of the blade-like portion and which in use opposes plastics material to be cut or sealed, the blade-like portion spacing the working face from the base portion;
    a strip-shaped electrical resistance heating element embedded in the low thermal inertia die and configured to heat the low thermal inertia die, the strip-shaped electrical resistance heating element having first and second elongate edges; and
    a sensor configured to sense temperatures at the working face of the low thermal inertia die;
    wherein the blade-like portion has a depth greater than its width in transverse cross-section and a groove extending therethrough from the base portion towards the working face, the groove being configured to receive and position the strip-shaped electrical resistance heating element adjacent the working face with the first elongate edge closer thereto than the second elongate edge when the strip-shaped electrical resistance heating element is embedded in the low thermal inertia die.

* * * * *